United States Patent
MacArthur et al.

(10) Patent No.: US 8,649,884 B2
(45) Date of Patent: Feb. 11, 2014

(54) INTEGRATED LINEAR/NON-LINEAR HYBRID PROCESS CONTROLLER

(75) Inventors: Ward MacArthur, Scottsdale, AZ (US); Ranganathan Srinivasan, Karnataka (IN); Sriram Hallihole, Karnataka (IN); Madhukar Madhavamurthy Gundappa, Karnataka (IN); Sanjay Kantilal Dave, Karnataka (IN); Sujit Gaikwad, Glendale, AZ (US); Sachi Dash, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 330 days.

(21) Appl. No.: 13/192,233

(22) Filed: Jul. 27, 2011

(65) Prior Publication Data

US 2013/0030554 A1 Jan. 31, 2013

(51) Int. Cl.
G05B 13/04 (2006.01)
(52) U.S. Cl.
USPC .............................. 700/40; 700/44
(58) Field of Classification Search
None
See application file for complete search history.

(56) References Cited

U.S. PATENT DOCUMENTS

| | | | |
|---|---|---|---|
| 2002/0178133 A1* | 11/2002 | Zhao et al. | 706/21 |
| 2004/0098145 A1 | 5/2004 | Zhenduo et al. | |
| 2009/0043546 A1 | 2/2009 | Srinivasan et al. | |
| 2009/0177291 A1 | 7/2009 | Boe et al. | |
| 2012/0209432 A1 | 8/2012 | Fleischer et al. | |

FOREIGN PATENT DOCUMENTS

| | | |
|---|---|---|
| JP | 11033580 | 2/1999 |
| KR | 100920522 | 10/2009 |

* cited by examiner

*Primary Examiner* — Ryan Jarrett
(74) *Attorney, Agent, or Firm* — Jetter & Associates, P.A.

(57) ABSTRACT

A model predictive controller (MPC) for controlling physical processes includes a non-linear control section that includes a memory that stores a non-linear (NL) model that is coupled to a linearizer that provides at least one linearized model, and a linear control section that includes a memory that stores a linear model. A controller engine is coupled to receive both the linearized model and linear model. The MPC includes a switch that in one position causes the controller engine to operate in a linear mode utilizing the linear model to implement linear process control and in another position causes the controller engine to operate in a NL mode utilizing the linearized model to implement NL process control. The switch can be an automatic switch configured for automatically switching between linear process control and NL process control.

14 Claims, 5 Drawing Sheets

INTEGRATED LINEAR/NON-LINEAR HYBRID PROCESS CONTROLLER

FIELD

Disclosed embodiments relate to feedback control systems, more specifically to methods and systems for process control using model predictive controllers.

BACKGROUND

Processing facilities, such as manufacturing plants, chemical plants and oil refineries, are typically managed using process control systems. Valves, pumps, motors, heating/cooling devices, and other industrial equipment typically perform actions needed to process materials in the processing facilities. Among other functions, the process control systems often manage the use of the industrial equipment in the processing facilities.

In conventional process control systems, controllers are often used to control the operation of the industrial equipment in the processing facilities. The controllers can typically monitor the operation of the industrial equipment, provide control signals to the industrial equipment, and/or generate alarms when malfunctions are detected. Process control systems typically include one or more process controllers and input/output (I/O) devices communicatively coupled to at least one workstation and to one or more field devices, such as through analog and/or digital buses. The field devices can include sensors (e.g., temperature, pressure and flow rate sensors), as well as other passive and/or active devices. The process controllers can receive process information, such as field measurements made by the field devices, in order to implement a control routine. Control signals can then be generated and sent to the industrial equipment to control the operation of the process.

Advanced controllers often use model-based control techniques to control the operation of the industrial equipment. Model-based control techniques typically involve using an empirical model to analyze input data, where the model identifies how the industrial equipment should be controlled based on the input data being received.

Model predictive controllers (MPCs) rely on dynamic models of the process, most often linear empirical models obtained by system identification. The models are used to predict the behavior of dependent variables (e.g. outputs) of a dynamic system with respect to changes in the process independent variables (e.g. inputs). In chemical processes, independent variables are most often setpoints of regulatory controllers that govern valve movement (e.g., valve positioners with or without flow, temperature or pressure controller cascades), while dependent variables are most often constraints in the process (e.g., product purity, equipment safe operating limits). The MPC uses the models and current plant measurements to calculate future moves in the independent variables that will result in operation that attempts to satisfy all independent and dependent variable constraints. The MPC then sends this set of independent variable to move to the corresponding regulatory controller setpoints to be implemented in the process.

In certain control systems, a difficulty may arise in operating different processes with characteristically different operating regimes. For example, some manufacturing processes, such as multi-variable chemical processes, may require control of both linear processes and non-linear processes simultaneously or successively for needed process control. Conventional controllers utilize separate linear and non-linear MPCs to handle each individual task.

SUMMARY

Disclosed embodiments recognize that conventional model predictive controllers (MPCs) that include separate non-linear and linear controllers reduce efficiency of the overall control process by increasing switchover times, and can absorb more of the user's time. Furthermore, the switchover may not be seamless which may cause a brief loss in control which can affect the integrity of the process, such as leading to one or more of production loss, out of specification product, poor quality product, and increased wear and tear on the equipment at the processing facility.

Disclosed embodiments solve the problems of conventional MPCs that include separate non-linear (NL) and linear controllers by instead providing an integrated hybrid MPC that includes both linear models and NL models. Such integrated hybrid MPCs allow switching based on the current mode or regime of operation of a physical process, such as a manufacturing process run by a processing facility or plant. The switching between linear and NL control can be a seamless bump-free switch because future process parameter predictions can be simultaneously available from both the linear model and the NL model, which facilitates smooth operation of plant or other physical system, such as during grade transitions as well as at grade operations.

DETAILED DESCRIPTION

Figure 1:
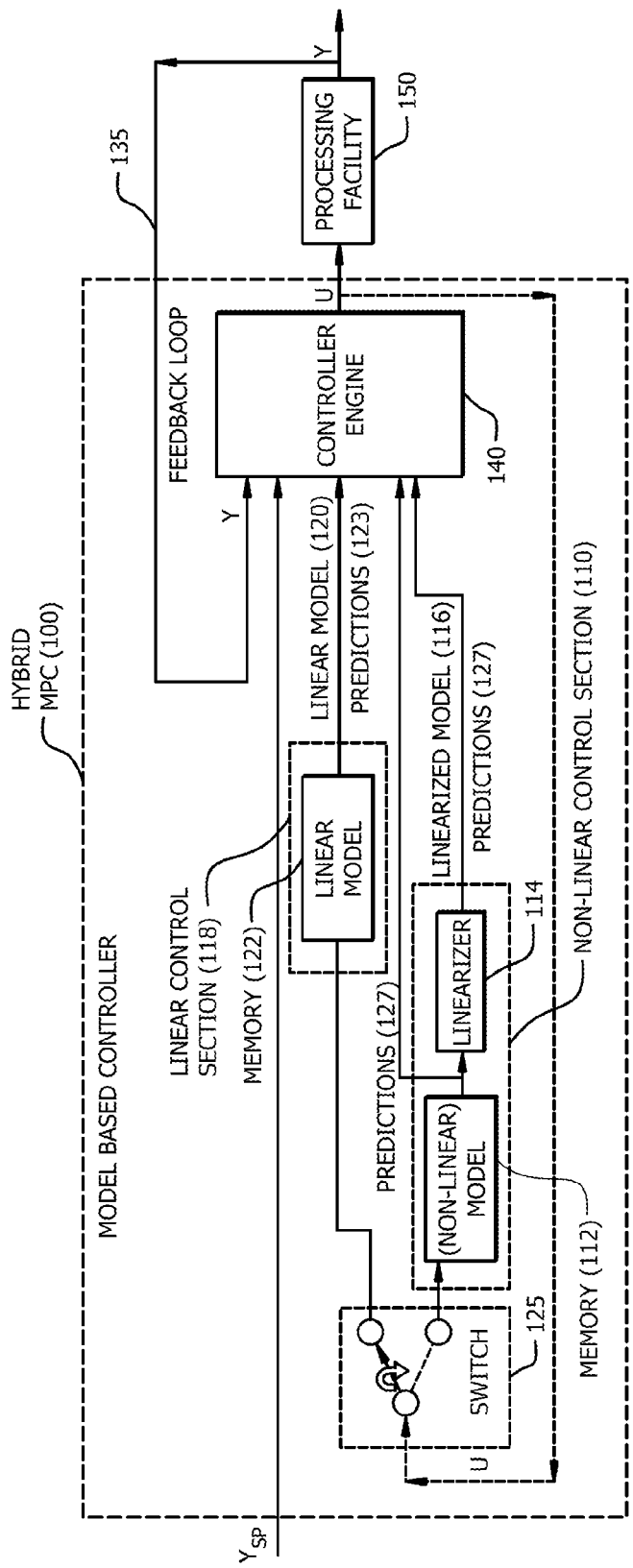
FIG. 1 is a block diagram of an example hybrid MPC that provides switching between linear and NL control modes, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include hybrid MPCs that can be applied to NL physical processes including non-linear manufacturing processes through a hybrid MPC framework which includes both linear models and NL models. The MPC can be switched between the linear and NL models seamlessly because future process parameter predictions can be simultaneously available from both the linear model and the NL model, which facilitates smooth operation of plant or other physical system. The user can switch control modes using a single switch, or the hybrid MPC can be automatically switched, between linear control and NL control depending on the current mode or regime of operation for the physical process being controlled.

As known in the art, it can be advantageous to use linear control for linear or substantially linear processes whenever possible because controlling a linear process or substantially linear process with a NL controller may be overkill and thus lead to degraded process performance. In particular, NL control involves an extra processing load associated with linearizing a NL model and updating gain info that reflects the change in a dependent variable (a CV) to a unit change in independent variable (one or more MVs), even though the process gain may not be changing significantly. The gain is generally determined for every CV/MV combination.

As used herein, a CV is a variable that can be used in a physical process and whose value depends on the use, or non-use, of one or more MVs. As used herein, a MV is a variable whose value can remain constant or be changed to achieve a desired result in a process, such as in a petroleum refining or processing plant, for example. The tense of "manipulated" is not intended to imply that a manipulation of the value has occurred. On the contrary, a "manipulated variable" is intended to convey a manipulatable variable whose value may or may not have been manipulated in the past and may or may not be manipulated in the future.

Moreover, linear control may be usable for certain NL processes because even though a process may be highly NL the operating regime and model of operation may dictate the NL exhibited by the process. For example, a highly non-linear polymer manufacturing process may exhibit severe non-linearities during grade transitions, whereas at grade operations for rejecting disturbances the non-linearities may not be significant and a simple linear controller may be able to properly control the process.

Conventional implementations for providing linear and NL control have separate software packages (run by separate controller engines) for the linear controller and the NL controller. This is necessitated by the way the controller design is carried with respect to tuning and controller set-up. Disclosed MPCs provide a single controller engine that provides both linear and NL control with similar tuning parameters the linear and NL control that provide a consistent way to tune and configure both the linear and NL controller. For example, setting CV/MV limits and/or most of the process-related tuning can be common for linear and NL control sections Moreover, disclosed MPCs can automatically highlight the process non-linearities to the user, such as by continuously monitoring gain changes in the system which allows an appropriate decision (automatic or manual) to switch to linear or NL control to be taken. Also model sensitivity information in the operating range can be considered for determining whether to switch to linear/NL control from the current control configuration.

FIG. 1 is a block diagram of an example hybrid MPC 100 that provides switching between linear and NL control modes, according to an example embodiment, shown controlling a process run by processing facility 150 that runs a physical process, such as a processing facility 150 comprising a chemical plant or oil refinery. Although shown controlling a single MV shown as Y, disclosed hybrid MPCs such as MPC 100 can simultaneously control a plurality of MVs.

MPC 100 includes a NL control section 110 that comprises a memory block 112 that stores a NL model that is coupled to a linearizer 114 that generates a linearized model 116, and a linear control section 118 that includes a memory 122 that stores a linear model 120. The respective models stored by memory 112 and 122 can be generated offline and loaded into memory. However, disclosed embodiments also include online model development. The linearized model 116 is generated by linearizer 114 through linearizing the NL model provided by memory 112 in the current control cycle, or in one of the previous control cycles. Thus, MPC 100 has at least one of (i) a linear model 120 and future predictions 123 from the linear model 122 and (ii) a linearized model 116 and future predictions 127 from either linearizer 114 or directly from memory 112 available for currently use.

Example non-linear models that can be used with disclosed embodiments include empirical data-based models such as black-box (BB) model(s), grey-box (GB) model(s), and first-principle models such as white-box (WB) model(s). Within BB model(s), the user may develop non-linear autoregressive with exogenous inputs (NARX) and non-linear output error (NOE) types of empirical data-based models. Within GB model(s), the user can develop Hammerstein, Wiener and Hammerstein-Wiener type of empirical data-based models. Linearizer 114 provides or otherwise generates linearized models 116 (e.g., a state space model), which can include piecewise linear models, based upon a generally NL model of the process.

The linear model 120 can include, but is not limited to models including, finite impulse response (FIR), closed loop identification (CLID), prediction error method (PEM), and combinations thereof. MPC 100 includes is shown including a single switch 125 that can be part of a UI (see FIG. 2B) that in one position allows MPC 100 to directly utilize linear model 120, and in another position allows MPC 100 to use the linearized model 116 provided by linearizer 114. The switch 125 can also comprise an automatic switch configured for automatically switching between linear process control and NL process control, and thus be separate from the UI.

A dynamic system can be described by a set of state-space equations. A state space representation is a linearized mathematical model of a physical system as a set of input, output and state variables related by first-order differential equations, and the corresponding state space matrices. NL control may be based on a successive linearization strategy, with a state estimation technique embedded to reject unmeasured disturbances as fast as possible. The successive linearization strategy can result in state-space matrices and the NL model for MPC 100 can be based on this state space model. State-space matrices has been found to allow seamless switching between a linear and NL controller because the state evolution (using a state estimator) contains the latest information and the linearized model is obtained with respect to this state so that the model obtained provides future predictions which are seamless. Since the future predictions are seamless the switching of models is also seamless.

A state-estimator may be based on Kalman filtering. The unforced future predictions provided by MPC 100 to controller engine 140 may be obtained using two or more methods. The unforced forward prediction may be based on velocity model norms. A first method (linear method) may use the traditional step response coefficients obtained from a linearized model 120 of the controlled system to compute the unforced prediction. In the second method (NL method), the unforced future predictions may be obtained NL control section 110 utilizing a linearized state-space model with the initial condition being the Kalman corrected state at every cycle.

In some embodiments, both the first and second methods are used by MPC 100 to compute the unforced future prediction at every computation cycle. However based on the linear/non-linear controller type, one of these forward prediction calculations may be used in the controller move calculation. When the MPC 100 is in the linear mode, the MPC 100 may use the unforced future prediction computed using the above described first method. If the MPC is operating in the NL mode, the unforced future prediction using the second method may be used. In embodiments where the first and second methods are both executed every cycle, a seamless or bump-free switch may be achieved when the MPC mode is switched from NL to linear or vice versa. In some embodiments, various tuning knobs specific to a NL controller may be masked to the user. The various tuning knobs or functions they perform may be operated internally by the controller. In embodiments where NL tuning knobs are masked, the user may have access to tuning knobs specific to a linear controller, in which case, such tuning knobs may be customized to function for a non-linear controller as well.

Controller engine 140 is shown receiving future process parameter predictions 123 from memory 122 and future process parameter predictions 127 from linearizer 114, a setpoint value for the MV Y shown as $Y_{SP}$ which can be provided by the UI, and the current value of Y provided by a suitable sensor (e.g., temperature sensor when the MV is temperature) that is coupled to the processing facility 150 via feedback loop 135. The feedback loop 135 can be a wired or wireless loop. Controller engine 140 outputs one or more control signals shown as U which represents a control trajectory, that is coupled to an actuator (not shown) within processing facility 150 that effectuates a change in Y so that the error between Y and $Y_{SP}$ is reduced. Generally, only the first move in U is implemented.

Switch 125 receives a control signal from controller engine 140 shown as U, and based on U can automatically switch between linear control directly using linear model 120, or NL control using linearized model 116 provided by NL control section 110. In one embodiment, gain map information is used to determine switching between linear and NL control. For example if the gain information does not changes within an allowed/specified tolerance, then linear control can be used. To speed switching, such as from NL control to linear control, the model utilized after the switch can be the most recently used model, or a default (or backup) model.

Various reasons can be for switching between linear and NL control. For example, the process operation regime may change based on demand from customers. In one particular example, a plant may be manufacturing a product of Grade-A and the customer places a order for a different grade Grade-B, which has different specifications, so that the regime of operation changes for Grade-B compared to Grade-A. In another example, a known disturbance of high magnitude occurs in the physical process, such as a severe failure in cooling jacket system, resulting in increasing reactor temperature. In yet another example, the process may be operating at a new grade after grade transition and with minimal disturbances, so there is no need for NL control and the MPC 100 can switch to linear control.

Figure 2A:
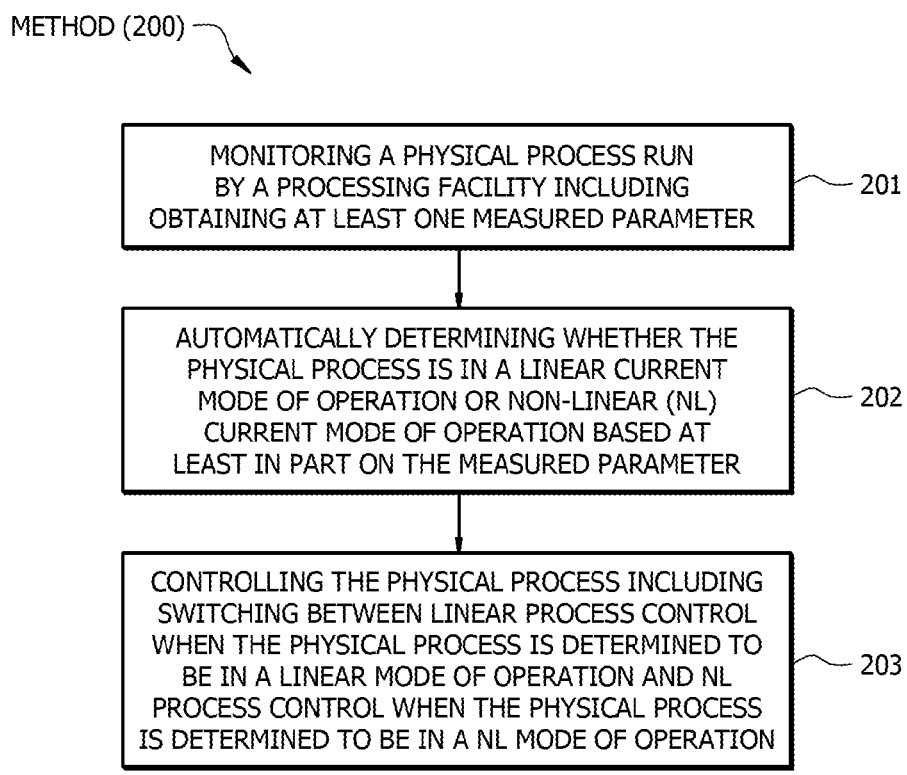
FIG. 2A is a flow chart that shows steps in an example method of controlling a physical process with a hybrid MPC, according to an example embodiment.

FIG. 2A is a flow chart that shows steps in an example method 200 of controlling a physical process with a hybrid MPC, according to an example embodiment. Step 201 comprises monitoring a physical process run by a processing facility including obtaining at least one measured parameter. Step 202 comprises automatically determining whether the physical process is in a linear current mode of operation or non-linear current mode of operation based at least in part on the measured parameter. Step 203 comprises controlling the physical process including switching between linear process control when the physical process is determined to be in a linear mode of operation and NL process control when the physical process is determined to be in a NL mode of operation.

Figure 2B:
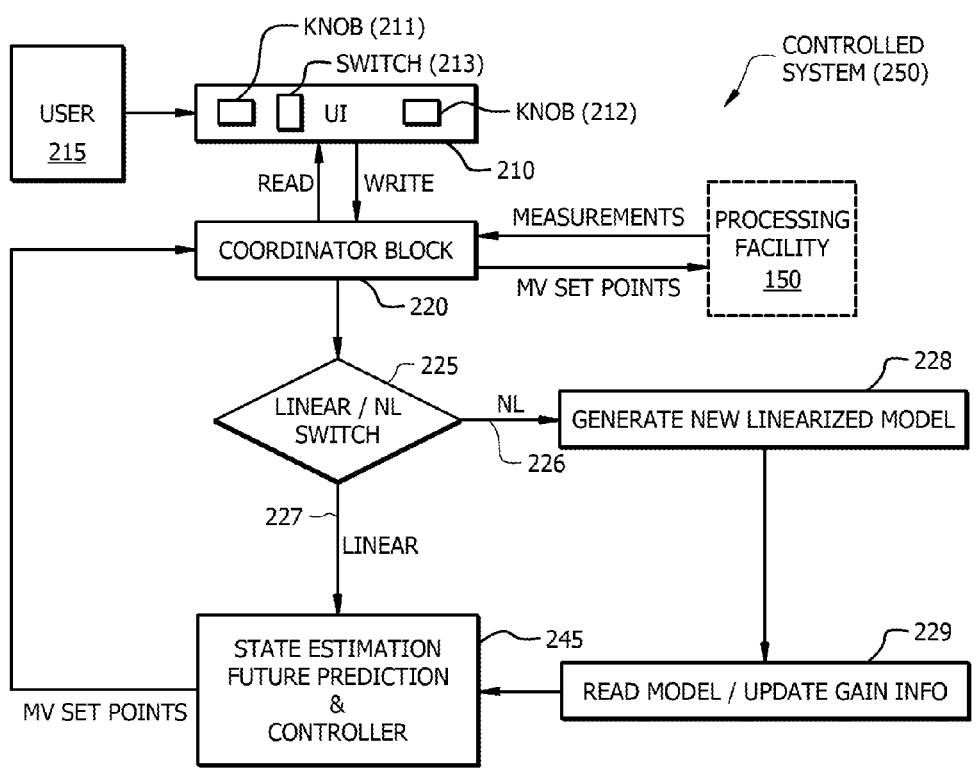
FIG. 2B shows a controlled system including functional blocks and data flow for controlling a processing facility running a manufacturing process including a single user interface (UI) that includes a switch for switching between linear and NL control modes using a disclosed hybrid MPC, according to an example embodiment.

FIG. 2B shows a controlled system 250 including functional blocks and data flow for controlling a processing facility running a manufacturing process including a single user interface (UI) 210 that includes a switch for switching between linear and NL control modes using a disclosed hybrid MPC, according to an example embodiment. System 250 includes a single UI 210 that allows switching between linear and NL control modes. UI 210 includes tuning knobs 211 and 212, with at least one of these tuning knobs operable for both linear process control and NL process control. Switch 213 allows a user to manually switch between linear control and NL control. The UI 210 can present various control information to a user such as a process operator, technician or engineer, including displays that correspond to process parameters, and trends for controller inputs and/or outputs. A user 215 is shown positioned at the UI 210. The UI 210 is coupled to a coordinator block 220 that comprises a software component (algorithm) that is configured so that UI 210 can perform read and write operations with UI 210.

Coordinator block 220 receives measurements via the feedback loop 135 shown in FIG. 1 from sensors that sense from the physical process run by the processing facility 150 generally including MVs and MV setpoints from state estimation forward prediction and controller block 245 provided by controller engine 140 shown in FIG. 1, and the coordinator block 220 outputs MV setpoints to the processing facility 150. Coordinator block 220 thus interacts between the actual physical process run by the processing facility 150, the state estimation forward prediction and controller block 245, the UI 210.

The user 215 can read process measurements (e.g., MV setpoints) from the state estimation forward prediction and controller block 245 shown, CVs and dependent variables (DVs) and or writes information such as MV setpoints, and tunings from the coordinator block 220. The flow also includes a decision block 225 where it is determined whether to implement NL or linear control. As noted above, the decision can be manual or automatic. If NL control is implemented, the NL path 226 is followed which comprises generating a new linearized model 228 and then reading the model and the updating gain information 229. The gain can be determined for every CV/MV combination. If linear control is implemented the linear path 227 shown in FIG. 2B is followed.

The updated information from model and the updating model information block 229 in the case of NL control, or linear model information in the case of linear control is coupled to the state estimation forward prediction and controller block 245. State estimation forward prediction and controller block 245 generates updated MV setpoints that as noted above are provided to coordinator block 220, which can be read by user 215 via UI 210.

Disclosed embodiments can be applied to generally controlling a variety of physical processes, for example but not limited to manufacturing processes such as paper manufacturing, pH control, polymer manufacturing, ammonia synthesis, distillation columns. However, disclosed hybrid MPCs can be used with systems involving physical processes that may result in other types of end products, such as control of a gas turbine powering an aircraft.

Figure 3:
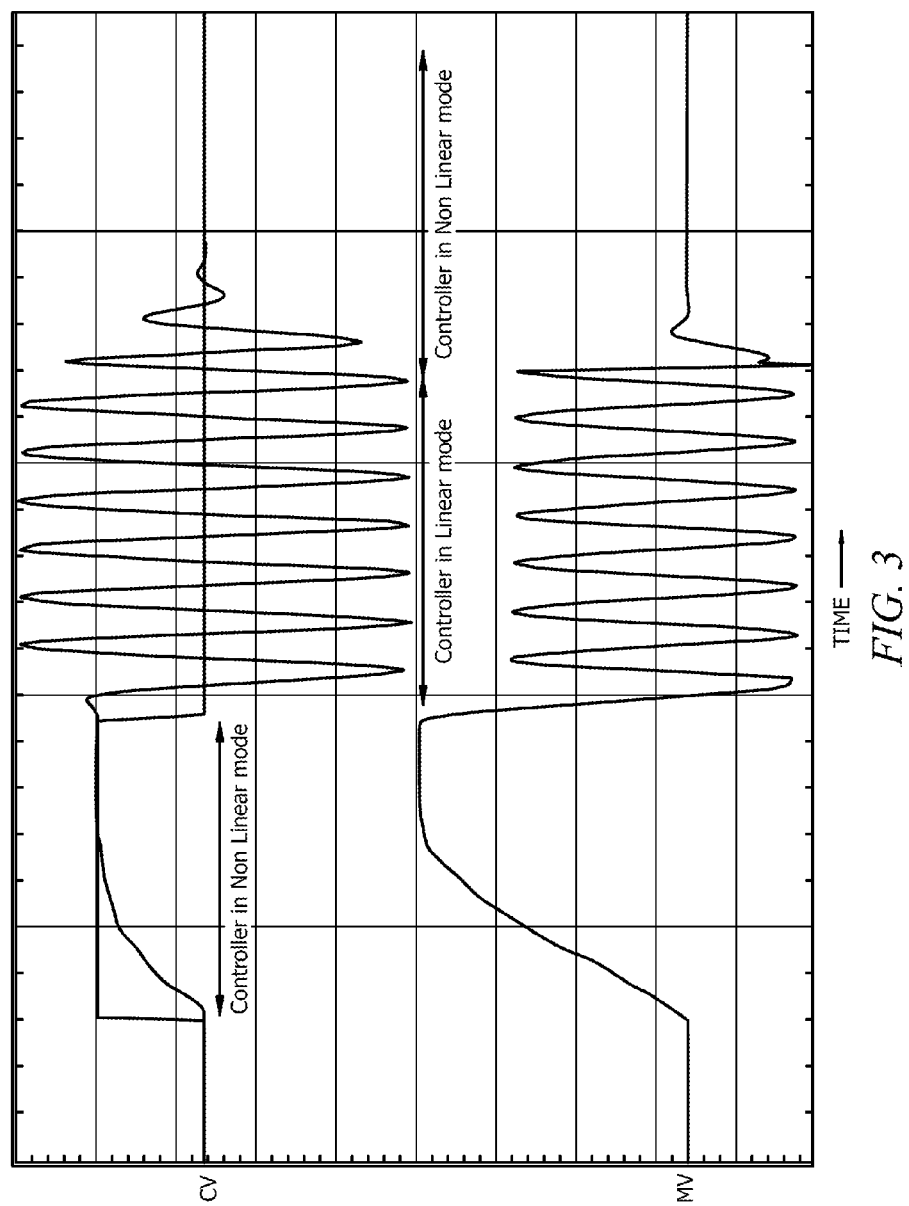
FIG. 3 shows the response from simulation of an example hybrid MPC based on the hybrid MPC shown in FIG. 1 for a controlled variable (CV) and its corresponding high limit and low limit and the corresponding manipulated variable (MV) which is acting on that CV, according to an example embodiment.
Figure 4:
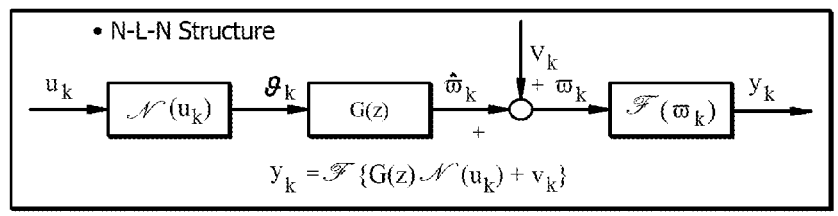
FIG. 4 shows a Hammerstein-Wiener (N-L-N) NL structure and its relations.

FIG. 3 shows the response from simulation of an example hybrid MPC based on MPC 100 for a CV and its corresponding High Limit and Low Limit and the corresponding MV which is acting on that CV, according to an example embodiment. The response shown demonstrates switching between linear and NL control modes during a period of operation showing operation of the MPC in a NL mode and in a linear mode, and evidences a seamless mode transition. The simulations are based on a NL physical process which is governed by the Hammerstein-Wiener (N-L-N) NL structure and its relations, that are shown in FIG. 4.

The NL process being controlled using a disclosed hybrid MPC can be seen to switch between linear and NL controller modes. In FIG. 3 it can be observed that if the controller mode is "non-linear" as mentioned in the UI display then the process is well controlled and the process is able to reach the set-point(s) easily. For the same process when the controller mode is "linear" and a step change in a MV is provided then it can be observed there are sustained oscillations as highlighted in FIG. 3. The sustained oscillations die down rapidly and smooth control is achieved when the switch is triggered to change the controller model from "linear" to "nonlinear". Although not show, the controller mode can later be switched back to linear mode after the sustained oscillations fall below a predetermined level.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A method for controlling physical processes, comprising:
    monitoring a physical process run by a processing facility including obtaining at least one measured parameter;
    automatically determining whether said physical process is in a linear current mode of operation or non-linear (NL) current mode of operation based at least in part on said measured parameter, and
    controlling said physical process including switching from NL process control using a NL process model to linear process control using a linear process model when said physical process is determined in said automatically determining to be in said linear current mode of operation and from said linear process control using said linear process model to NL process control using said NL process model when said physical process is determined in said automatically determining to be in said NL current mode of operation.

2. The method of claim 1, wherein said switching is automatic switching.

3. The method of claim 1, wherein said switching is manual switching.

4. The method of claim 1, wherein future process parameter predictions are simultaneously provided while operating in said linear process control by said linear process model and while operating in said NL process control by said NL process model to speed said switching between said linear process control and said NL process control.

5. The method of claim 1, wherein a single hybrid controller engine provides said controlling for both said linear process control and said NL process control.

6. The method of claim 1, further comprising at least one common configuration step for configuring said linear process control and said NL process control.

7. The method of claim 1, wherein said NL process control is implemented from successive linearization of a NL model, wherein said NL model is based on a state space model comprising state-space matrices.

8. A model predictive controller (MPC) for controlling a physical process, comprising:
    a non-linear (NL) control section that includes a memory that stores a non-linear (NL) model that is coupled to a linearizer that provides at least one linearized model;
    a linear control section that includes a memory that stores a linear model;
    a controller engine coupled to receive both said linearized model and said linear model, wherein said controller engine implements automatically determining whether said physical process is in a linear current mode of operation or NL current mode of operation based at least in part on a measured parameter from said physical process, and
    a switch that in one position causes said controller engine to operate in a linear mode utilizing said linear model to implement linear process control and in another position causes said controller engine to operate in a NL mode utilizing said linearized model to implement NL process control;
    wherein said switch is configured for switching from said NL process control using said linearized model to said linear process control using said linear model when said physical process is determined to be in said linear current mode of operation and from said linear process control using said linear model to said NL process control using said linearized model when said physical process is determined to be in said NL current mode of operation.

9. The MPC of claim 8, wherein said controller engine consists of a single hybrid controller engine that provides both said linear mode and said NL mode.

10. The MPC of claim 8, further comprising a user interface (UI) that includes said switch that is operable for manual switching said controller engine between said linear mode and said NL mode.

11. The MPC of claim 10, wherein said UI includes at least one tuning knob that is operable for both said linear process control and said NL process control.

12. The MPC of claim 8, wherein future process parameter predictions are simultaneously provided while operating in said NL process control by said linearized model and while operating in said linear process control by said linear model to speed said switching between said linear process control and said NL process control.

13. The MPC of claim 8, wherein said switch comprises an automatic switch configured for automatically performing said switching.

14. The MPC of claim 8, wherein said NL process control is implemented from successive linearization of said NL model, and wherein said NL model is based on a state space model comprising state-space matrices.

* * * * *